United States Patent Office 2,799,691
Patented July 16, 1957

2,799,691

1-OXY-4-METHYL-17-OXYACETYL-1,3,5-ESTRATRIENES AND METHOD

Robert L. Clarke, Elsmere, N. Y., assignor to Sterling Drug Inc., New York, N. Y., a corporation of Delaware No Drawing. Application March 2, 1956,
Serial No. 568,969

4 Claims. (Cl. 260—397.47)

I have invented a new class of steroids, namely 1-hydroxy-4-methyl-17-hydroxyacetyl - 1,3,5 - estratriene and esters thereof, and a process for their preparation. These compounds possess hormone and enzyme-inhibitory properties, and they are also useful as intermediates in the preparation of other hormonal substances.

1 - hydroxy-4-methyl-17-hydroxyacetyl-1,3,5-estratriene and esters thereof have the structural formula

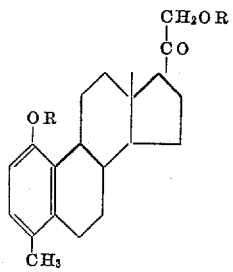

wherein R is hydrogen or an acyl group. The acyl group is derived from lower-alkanoic acids such as formic acid, acetic acid, propionic acid and butyric acid, lower-alkane-dicarboxylic acids such as oxalic acid, malonic acid and succinic acid, or monocyclic-aromatic-carboxylic acids such as benzoic acid, p-nitrobenzoic acid, 3,5-dinitrobenzoic acid and the like.

The above compounds are prepared by treating 21-acetoxy-1,4-pregnadiene-3,20-diol, one of the products of the reaction of progesterone with lead tetraacetate, with a solution of concentrated sulfuric acid in acetic anhydride. Rearrangement and aromatization of ring A of the steroid molecule occur. The product is purified by chromatography to give 1-hydroxy-4-methyl-17-hydroxyacetyl-1,3,5-estratriene diacetate. The latter is readily saponified to give 1-hydroxy-4-methyl-17-hydroxyacetyl-1,3,5-estratriene, which can be reesterified by treatment with an acid halide or an acid anhydride. The starting material, 21 - acetoxy - 1,4 - pregnadiene-3,20-diol, is described in the copending application of Aram Mooradian, Serial No. 253,195, filed October 25, 1951, now U. S. Patent 2,745,851.

The structure of the compounds of the invention was assigned on the basis of chemical analysis, the phenolic character of the compound where R is hydrogen, and by analogy with the mechanism of reaction determined by Woodward and Singh, J. Am. Chem. Soc. 72, 494–500 (1950), for model bicyclic compounds.

The following examples will further illustrate my invention.

EXAMPLE 1

*1-hydroxy-4-methyl-17-hydroxyacetyl-1,3,5-estratriene diacetate*

To a solution of 900 mg. of 21-acetoxy-1,4-pregnadiene-3,20-dione in 60 ml. of acetic anhydride was added, all at once, a solution of 600 mg. of concentrated sulfuric acid in 18 ml. of acetic anhydride. This mixture was allowed to stand for three hours at room temperature, then poured into 250 ml. of ice water and agitated until the excess acetic anhydride had decomposed. The solid material was collected by filtration, air dried, and dissolved in 150 ml. of ether. An aqual volume of petroleum ether (Skellysolve A) was added, and the solution was poured onto a 2 x 53 cm. column containing 80 g. of 100–200 mesh silica gel. The adsorbed material was then eluted by means of a 1:1 mixture of ether and petroleum ether. The first 1.7 liters of eluate contained substantially all of the product, and recrystallization of the material from 12 ml. of acetone gave 523 mg. of 1-hydroxy-4-methyl-17-hydroxyacetyl-1,3,5 - estratriene diacetate, M. P. 188.5–189.5° C., $[\alpha]_D^{22} = +232°$ (1.77% in chloroform). Evaporation of the filtrate from recrystallization to a 3 ml. volume and addition of 3 ml. of petroleum ether (Skellysolve A) gave 129 mg. of additional product, M. P. 187.5–189.5° C.

*Analysis.*—Calcd. for $C_{25}H_{32}O_5$: C, 72.79; H, 7.82; acetate, 20.85. Found: C, 72.95; H, 7.70; acetate, 20.65.

EXAMPLE 2

*1-hydroxy-4-methyl-17-hydroxyacetyl-1,3,5-estratriene*

A mixture of 200 mg. of 1-hydroxy-4-methyl-17-hydroxyacetyl-1,3,5-estratriene diacetate, prepared as described above in Example 1, 250 mg. of potassium bicarbonate, 20 ml. of methanol and 4.5 ml. of water was heated at reflux for two hours. The methanol was removed, the residue extracted with ether, and the ether extracts dried and concentrated. The resulting solid residue was recrystallized once from an acetone-petroleum ether (Skellysolve A) mixture and then once from a benzene-petroleum ether (Skellysolve B) mixture to give 88 mg. of 1-hydroxy-4-methyl-17-hydroxyacetyl-1,3,5-estratriene, M. P. 215–218° C., $[\alpha]_D^{24} = +269° + 10°$ (2.65% in ethanol).

*Analysis.*—Calcd. for $C_{21}H_{28}O_3$: C, 76.80; H, 8.59. Found: C, 76.70; H, 8.46.

EXAMPLE 3

1 - hydroxy-4-methyl-17-hydroxyacetyl-1,3,5-estratriene reacts with propionic anhydride, succinic anhydride or benzoyl chloride to give, respectively, 1-hydroxy-4-methyl-17 - hydroxyacetyl-1,3,5-estratriene dipropionate, 1-hydroxy - 4 - methyl - 17-hydroxyacetyl-1,3,5-estratriene di-(acid succinate) or 1-hydroxy-4-methyl-17-hydroxyacetyl-1,3,5-estratriene dibenzoate.

1 - hydroxy-4-methyl-17-hydroxyacetyl-1,3,5-estratriene was tested for anti-accelerator activity by measuring its effect in counteracting the cardiac acceleration produced by epinephrine (5–10 micrograms per cc.) in the isolated perfused rabbit heart. The compound was active at a dose of 100 micrograms per heart. This indicates that the compound also has been similar to those of veratramine, particularly in lowering the blood pressure.

1 - hydroxy-4-methyl-17-hydroxyacetyl-1,3,5-estratriene diacetate was administered orally to mice at a dose of 200 mg./kg. of body weight as a 2% suspension in 1% gum tragacanth. After 45 minutes a 100 mg./kg. dose of hexobarbital was administered intraperitoneally. It was found that the sleeping time in these mice was increased by 22.5–71.2% as compared to the sleeping time in mice treated with hexobarbital only. These results indicate that 1-hydroxy-4-methyl-17-hydroxyacetyl-1,3,5-estratriene diacetate has central nervous system depressant activity and is useful as a potentiaor for barbiturates.

The compounds of the invention can be prepared for use by formulating sterile aqueous suspensions, or oil solutions or oil-water emulsions, for oral or parenteral injection, in the same manner in which conventional steroidal substances are formulated.

This application is a continuation-in-part of my copending application, Serial No. 381,516, filed September 21, 1953, now abandoned.

I claim:
1. A compound having the formula

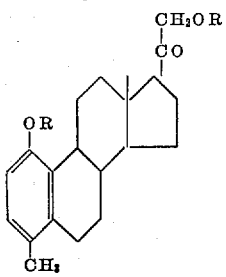

wherein R is a member of the group consisting of hydrogen and acyl groups derived from acids selected from the group consisting of lower-alkanoic acids, lower-alkanedicarboxylic acids and monocyclic aromatic carboxylic acids.

2. 1-hydroxy-4-methyl-17-hydroxyacetyl-1,3,5-estratriene.

3. 1-hydroxy-4-methyl-17-hydroxyacetyl-1,3,5-estratriene diacetate.

4. The process for preparing 1-hydroxy-4-methyl-17-hydroxyacetyl-1,3,5-estratriene diacetate which comprises reacting 21-acetoxy-1,4-pregnadiene-3,20-diol with a solution of concentrated sulfuric acid in acetic anhydride.

References Cited in the file of this patent
UNITED STATES PATENTS
2,666,769    Colton _____ Jan. 19, 1954

OTHER REFERENCES
Djerassi, Jour. Am. Chem. Soc. 71, 3962–6 (1949).

UNITED STATES PATENT OFFICE

CERTIFICATE OF CORRECTION

Patent No. 2,799,691                                  July 16, 1957

Robert L. Clarke

It is hereby certified that error appears in the printed specification of the above numbered patent requiring correction and that the said Letters Patent should read as corrected below.

Column 2, line 5, for "aqual" read -- equal --; line 36, for "$=+269°+10°$" read -- $=+269°\pm10°$ --; line 54, for "been" read -- uses --; line 66, for "potentiaor" read -- potentiator --.

Signed and sealed this 1st day of October 1957.

(SEAL)
Attest:
KARL H. AXLINE

Attesting Officer

ROBERT C. WATSON
Commissioner of Patents